United States Patent [19]
Auten et al.

[11] 3,802,115
[45] Apr. 9, 1974

[54] NOISE MAKING FISHING LURE AND METHOD THEREOF

[76] Inventors: Charles A. Auten, 7415 Dorothy Dr., Indianapolis, Ind. 46260; Ricky A. Fischer; Logan H. Fischer, both of 4511 N.W. 34th Ct., Fort Lauderdale, Fla. 33313

[22] Filed: Jan. 31, 1972

[21] Appl. No.: 222,037

[52] U.S. Cl............... 43/42.31, 43/42.24, 43/42.53
[51] Int. Cl............................................ A01k 85/00
[58] Field of Search............ 43/42.53, 42.31, 42.24, 43/17.1, 42.06; 83/1, 30, 651, 660

[56] References Cited
UNITED STATES PATENTS
3,068,604  12/1962  Nyberg........................ 43/42.31 X
1,198,486  9/1916  Standish............................... 83/660
2,778,143  1/1957  Bratz, Sr....................... 43/42.31 X
3,165,858  1/1965  Rutter................................ 43/42.53

*Primary Examiner*—Louis G. Mancene
*Assistant Examiner*—Daniel J. Leach
*Attorney, Agent, or Firm*—Woodard, Weikart, Emhardt & Naughton

[57] ABSTRACT

A noise making fishing lure is made by forcing an elongated member into a worm-like body of soft flexible plastic material to form a cavity in the body and inserting a glass container having at least one metal ball loosely contained therein into the said cavity. A fish hook is attached to the worm-like lure body with the hook eye disposed entirely within the body and with the barbed end of the hook also positioned in the body.

4 Claims, 6 Drawing Figures

PATENTED APR 9 1974  3,802,115

NOISE MAKING FISHING LURE AND METHOD THEREOF

BACKGROUND OF THE INVENTION

1. Field of the Invention

This invention is in the field of fishing lures.

2. Description of the Prior Art

Fish rely upon two instincts when hunting food. The first instinct is sight and thus, artificial fishing lures are produced in many different colors. The second instinct utilized is vibration and thus, artificial fishing lures have been devised which produce vibrations for attracting fish. Four such noise making artificial fishing lures are disclosed in the following U. S. Pat. Nos. 2,659,176 issued to H. R. Wenger; 2,778,143 issued to L. E. Bratz, Sr.; 2,832,169 issued to K. S. Clapp; and 3,044,207 issued to E. A. Dorsett. All of the prior art artificial fishing lures must be produced at the factory and as a result, the fisherman must expend additional monies to purchase a noise making artificial fishing lure. Disclosed herein is a method for converting the silent type of artificial fishing lure into a noise making artificial fishing lure. As a result, the fisherman can thereby change their traditional silent type of fishing lures into the noise making artificial fishing lures.

SUMMARY OF THE INVENTION

A method of making a silent type of fishing lure into a noise making fishing lure comprises the steps of forcing an elongated hollow member into the silent type of fishing lure forming a cavity within the lure; and, inserting a container having at least one ball loosely contained therein into the cavity.

It is an object of the present invention to provide a method of making a silent type of fishing lure into a noise making type of fishing lure.

It is a further object of the present invention to provide a method for producing a noise making artificial fishing lure.

Related objects and advantages of the present invention will be apparent from the following description.

DESCRIPTION OF THE PREFERRED EMBODIMENT

Figure 1:
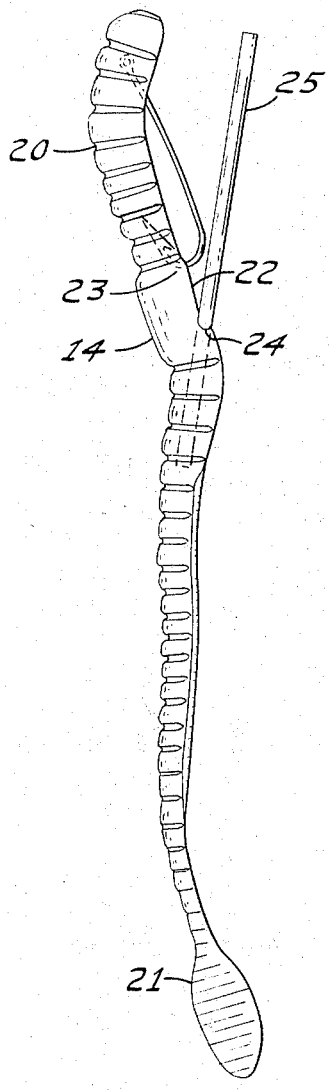
FIG. 1 is a side view of an artificial fishing lure with an elongated member being forced therein.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
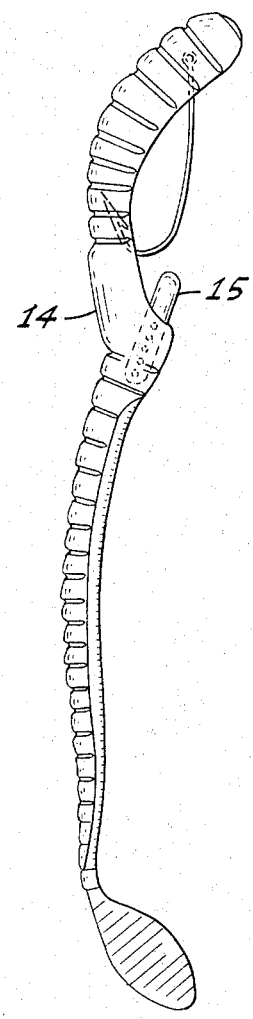
FIG. 2 is the same view as FIG. 1 only with a noise making container being shown inserted into the lure subsequent to the removal of the elongated member.
Figure 3:
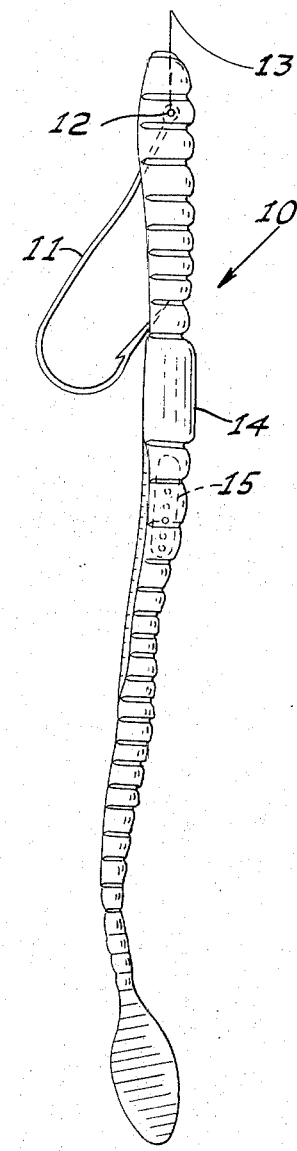
FIG. 3 is the same view as FIG. 2 only showing the noise making container positioned entirely within the artificial fishing lure.

Referring now more particularly to FIG. 1, there is shown an artificial fishing lure 14 which is produced from molded plastic and is configured in the shape of a worm. These worm like plastic artificial fishing lures are quite well known and thus, further elaboration thereon would be superfluous. Needless to say, worm 14 is provided with a flat tail 21, a smooth middle portion 22 and a head portion 20. The head portion 20 is provided with a plurality of grooves formed in its outer surface as is the part of the worm between middle portion 22 and tail portion 21. The bottom surface of the worm may be flat. A conventional metal hook 11 is mounted to the worm with the eyelet 12 of the hook being positioned entirely within the worm. A string 13 extends through eyelet 12 in order to allow the connection of the worm to the fishing line. The barbed end of the hook is also shown positioned within the worm. The barbed end 10 of hook 11 (FIG. 3) is shown partially withdrawn from the worm body as contrasted to the hooks of FIGS. 1 and 2 to illustrate the various positions possible between the hook and head portion 20.

Figure 6:
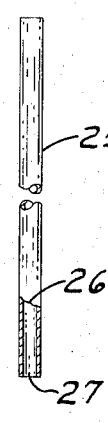
FIG. 6 is a fragmentary side view of the elongated member 25 shown in FIG. 1.

In order to change the silent type of fishing lure into a noise making fishing lure, an elongated hollow member 25 is forced into the silent type of fishing lure forming a cavity within the lure. A container having at least one ball loosely contained therein is then inserted into the cavity. In the lure shown in the drawing, the hollow elongated member 25 is forced into middle portion 22 immediately beneath the hook entrance 23 into the worm body. A fragmentary view of hollow member 25 is shown in FIG. 6 being fragmented at location 26 to show the hollow interior 27 of the member. The elongated member is forced into the lure shown in the drawing approximately a distance of 1 inch and then twisted 180° subsequent to the forcing step and then removed from the lure. As a result, a cavity is formed in the lure which opens through hole 24 of middle portion 22.

Figure 4:
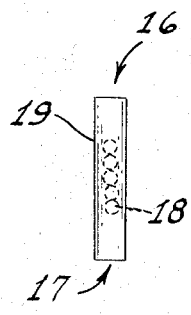
FIG. 4 is a side view of a hollow stem with a plurality of shot balls positioned therein.
Figure 5:
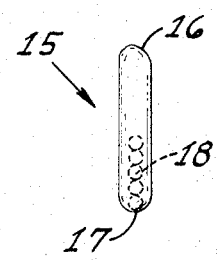
FIG. 5 is the same view as FIG. 4 only with the ends of the hollow stem sealed.

Container 15 has a hollow stem 19 containing a plurality of shot balls 18. The hollow stem is opened at both ends 16 and 17 in order to insert the shot balls. Ends 16 and 17 are then sealed so as to loosely contain the shot balls enabling the balls to rattle within the stem. The stem is shown unsealed in FIG. 4 and sealed in FIG. 5. Stem 19 may be made from a number of materials such as synthetic resin material.

The forming of the cavity within the artificial lure is accomplished by utilizing a cylindrical configured elongated member 25 having a diameter less than fifty percent of the diameter of container 15. As a result, when the container is positioned within the cavity, the lure material will tightly grip the container preventing accidental disengagement therefrom. The lure may be produced from molded plastic and as a result, the forcing step includes plastically deforming and tearing the plastic lure.

The inserting step includes initially placing the container partially into the cavity with a person's hand and then contacting the container with the elongated member so as to completely position and force the container into the cavity.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention and the scope of the claims are also desired to be protected.

We claim:

1. A method of making a silent type of fishing worm lure into a noise making fishing worm lure comprising the steps of:

placing a plurality of shot balls into a hollow stem;

sealingly closing the ends of said stem to form a container and a cavity holding said balls, said cavity sized to allow said balls to rattle therein as said container is moved;

forcing an elongated hollow member into said silent type of fishing worm lure forming a second cavity within the lure;

inserting a container having said balls loosely contained therein into said second cavity; and wherein:

said inserting step includes initially placing said container partially into said second cavity with a person's hand and then contacting said container with said elongated member to completely position and force said container into said second cavity;

said silent type of fishing lure is molded plastic and said forcing step includes plastically deforming and tearing said plastic.

2. The method of claim 1 wherein:

said forcing step includes forming said second cavity in a cylindrical configuration with said elongated member having a diameter less than fifty percent the diameter of said stem.

3. The method of claim 2 wherein:

in said forcing step said elongated member is forced approximately 1 inch into said silent type of fishing lure and further comprising:

twisting said elongated member 180 degrees subsequent to said forcing step; and, removing said elongated member from said silent type of fishing lure.

4. A noise making artificial fishing lure comprising:

an elongated worm-like body of soft flexible material;

a fish hook mounted to said body;

a glass capsule with opposite sealed ends mounted within said body having an inner wall defining a cavity; and, a plurality of metal balls positioned in said cavity of said capsule, said balls being sized to rattle against said inner wall producing noise as said worm-like body and said capsule are moved.

* * * * *